US006014137A

United States Patent [19]

Burns

[11] Patent Number: 6,014,137
[45] Date of Patent: Jan. 11, 2000

[54] ELECTRONIC KIOSK AUTHORING SYSTEM

[75] Inventor: Kevin S. Burns, Bellevue, Wash.

[73] Assignee: Multimedia AdVentures, Issaquah, Wash.

[21] Appl. No.: 08/810,949

[22] Filed: Feb. 27, 1997

Related U.S. Application Data

[60] Provisional application No. 60/012,341, Feb. 27, 1996.

[51] Int. Cl.[7] .................................................. G06F 15/21
[52] U.S. Cl. ......................... 345/334; 345/333; 345/342; 705/27; 707/517
[58] Field of Search ................................... 345/333–335, 345/342; 705/26, 27; 707/508, 511, 517

[56] References Cited

U.S. PATENT DOCUMENTS

| | | | |
|---|---|---|---|
| 4,817,043 | 3/1989 | Brown | 364/518 |
| 4,974,170 | 11/1990 | Bouve et al. | 364/518 |
| 5,237,157 | 8/1993 | Kaplan | 235/375 |
| 5,764,226 | 6/1998 | Consolatti et al. | 345/333 |
| 5,765,142 | 6/1998 | Allred et al. | 705/26 |
| 5,826,267 | 10/1998 | McMillan | 707/9 |

OTHER PUBLICATIONS

"Wish You Were Here," *Which Computer?*, Aug. 1994, pp. 40–41.

Y. Guang et al., "Driving the Citizen–Oriented Information on the Electronic Highway," Proceedings of the International Conference on Multimedia Computing and Systems, May 15–18, 1995, IEEE Computer Society Press, pp. 131–138.

G. Kearsley and R. S. Heller, "Multimedia in Public Access Settings: Evaluation Issues," *Journal of Educational Multimedia and Hypermedia*, vol. 4, No. 1, pp. 3–24.

W. Holfelder and D. Hehmann, "A Networked Multimedia Retrieval Management System for Distributed Kiosk Applications," *Proceedings of the IEEE International Conference on Multimedia Computing and Systems*, May 15–19, 1994, pp. 342–351.

P. Steiger, "Minnelli—Experiences with an Interactive Information Kiosk for Casual Users," *Proceedings of the UBILAB Conference* 1994 (Switzerland), Computer Science Research at UBILAB, pp. 124–133.

C. D. Martinez, "All That Jazz," *Presentations*, Jun. 1994, pp. 44–50.

J. H. Maloney and R. B. Smith, "Directness and Liveness in the Morphic User Interface Construction Environment," UIST '95, Nov. 14–17, 1995, pp. 21–28.

*Primary Examiner*—Amare Mengistu
*Assistant Examiner*—Vincent E. Kovalick
*Attorney, Agent, or Firm*—Elliot B. Aronson

[57] ABSTRACT

A multimedia kiosk authoring system for use in developing and maintaining user interface screens for multimedia kiosk systems. The authoring system enables the user interface for each individual kiosk to be customized quickly and easily within wide limits of variation, yet subject to constraints adhering the resulting interface to good standards of aesthetics and user friendliness. The system may be used to provide custom interfaces expeditiously even for hundreds of kiosks presenting information from numerous independent information sources. The authoring system uses the methods of object oriented programming to define specialized object classes for instantiation on individual kiosk interface screens subject to pre-defined limitations on variability. Links are provided to an appropriate database for multimedia presentations on an interface screen of content bearing information from the information providers.

10 Claims, 6 Drawing Sheets

ELECTRONIC KIOSK AUTHORING SYSTEM

Continuing data Provisional Application No. 60/012,341 filed Feb. 27, 1996.

BACKGROUND OF THE INVENTION

The present invention relates generally to electronic information delivery systems and more particularly to distributed electronic kiosk systems with multiple kiosk sites for presenting myriad amounts of information to users.

An electronic kiosk refers to a computer-based information delivery system generally accessible to some segment of the public for retrieving information or initiating transactions. An individual kiosk unit includes a display screen for presenting information to the user and some form of computer input device for the user such as a touch screen or keypad, although a full keyboard or mouse could also be provided. The type of kiosk system of interest here is an interactive system having multiple kiosk sites at which a user at an individual kiosk can select a topic or search for information about a topic from a large database of information.

Such kiosk systems have become popular in recent years. They are found, for example, at museums and exhibitions, airports, public transportation stations, banks, and even in retail establishments for the use of customers. Examples of kiosk systems are disclosed in U.S. Pat. No. 4,817,043 of Brown, U.S. Pat. No. 4,974,170 of Bouve et al., and U.S. Pat. No. 5,237,157 of Kaplan. Recently multimedia kiosks have appeared presenting information to the user not only as text on the display screen, but also in the form of graphics, audio clips, animated sequences of still images, and even video clips. The travel agency Thomas Cook, for example, has introduced a multimedia kiosk for arranging holiday travel, reported in *Which Computer?*, August 1994, pp.40–41.

The present invention addresses the development of an electronic kiosk system comprising a large number of individual kiosks located at a variety of different sites for providing a selection of information customized to each site. For purposes of illustration the present invention is discussed in the context of a kiosk system serving a geographical region popular for skiing. Kiosks may be located, for example, at individual ski areas, at hotels and resorts in the area, and at ski shops and other retail shops. The information available to a user at an individual kiosk will depend on the nature of the establishment in which the kiosk is located. A kiosk at a ski shop, for example, may provide information about the lines of rental equipment available at the shop and may also provide information about the local ski areas, ski conditions, and even local restaurants and events. Kiosks at different ski shops would have to be customized for each shop at the least because rental equipment will generally differ from shop to shop. A kiosk at a local hotel may also provide information about the local ski areas, ski conditions and events, and may provide information about the ski shops in the area that rent and sell ski equipment. The hotel kiosk would generally not provide information about other hotels in the area and may or may not provide information on restaurants outside the hotel. A ski area kiosk may provide information on lift tickets, ski conditions, specific ski runs, ski school and day care, as well as information on ski rental, shops, restaurants, local events and the like. In a region encompassing several ski areas and towns with numerous shops, restaurants, places to stay, and places of nightly entertainment, such a kiosk system could include hundreds of kiosks, each having its own user interface and presenting its own unique selection of information.

The custom design of each individual kiosk can be a formidable undertaking. There are a great variety of possibilities for laying out the user interfaces, especially for a multimedia kiosk. A ski shop kiosk, for example, may want to display an initial stylistic presentation of the ski shop's name, perhaps overlaid on a graphic image of a skier executing an exciting ski maneuver. For a line of specialized rental skis the kiosk may present a video clip, perhaps accompanied by an audio clip, showing the ski in its specialized use. For information on a restaurant the kiosk may display a graphic image depicting patrons in the restaurant to show the atmosphere and dress appropriate to the restaurant. The kiosk may also display the restaurant menu either as a computer text file or as a graphic image of a stylish menu used in the restaurant.

These examples demonstrate the great variety of user interfaces available and highlight the effort required to develop a customized interface for each kiosk. The problem is intensified because each kiosk interface will generally have to be changed from time to time either sporadically or at regular intervals. For example, a kiosk that displays a graphic image of patrons at a restaurant to show the atmosphere and appropriate dress may find it desirable to change the graphic image with the season since a scene showing winter dress would not be appropriate in the summer. A ski shop may not carry precisely the same lines of equipment from one season to the next, and its kiosk will have to be modified to show the current equipment. Sometimes more extensive modification will be needed. A shop that carries ski equipment in the winter may specialize in other activities in the summer, for example, tennis, golf, swimming, boating or hiking. The kiosk's user interface would have to be extensively revised with the changes in season to reflect the shop's new emphasis and goods, and the information content available to the kiosk would have to be updated to include the summertime goods and activities. A shop or hotel that displays information on ski areas in the winter may want to display information about tennis, golf and other outdoor activities in the summer. In any one geographical region changes of this sort may have to be made to hundreds of kiosks or more.

Some of the problems to be overcome to make a kiosk system of this sort commercially viable are the organization of the data for potentially hundreds of kiosks and even more data sources so that a customized selection of data will be accessible to users at each of the kiosks; the customization of the user interface for each of the potentially hundreds of kiosks or more in the system in a manner that is economically feasible; the ability to update the data available to the kiosks quickly and easily; and the ability to modify the user interface of any one kiosk quickly and easily.

The organization of data for kiosk systems and the form of the user interface are active areas of study, in which no consensus has yet been reached; See, for example, Y. Guang et al., "Driving the Citizen-Oriented Information on the Electronic Highway," *Proceedings of the International Conference on Multimedia Computing and Systems*, May 15–18, 1995, IEEE Computer Society Press, pp.131–138; G. Kearsley and R. S. Heller, "Multimedia in Public Access Settings: Evaluation Issues," *Journal of Educational Multimedia and Hypermedia*, Vol 4, No. 1, pp.3–24; W. Holfelder and D. Hehmann, "A Networked Multimedia Retrieval Management System for Distributed Kiosk Applications," *Proceedings of the IEEE International Conference on Multimedia Computing and Systems*, May 15–19, 1994, pp. 342–351; P.

Steiger, "MINNELLI—Experiences with an Interactive Information Kiosk for Casual Users," *Proceedings of the UBILAB Conference* 1994 (*Switzerland*), Computer Science Research at UBILAB, pp. 124–133.

To assist in creating and modifying computer interface screens, a number of commercial authoring software products are available. With such software a programmer can design the layout of a display screen such as the size, character and placement of buttons and windows on the screen and combine text, graphics, audio and video into a user-friendly application screen interface. In general, authoring tools comprise prewritten computer code having a functionality for reading a data structure that defines a task to be taken and performs the task based on the data. Examples include Macromedia Director, Asymmetrix Multimedia ToolBook, and Oracle's Media Objects. High-end authoring systems have the capability to integrate different media and they include full application-building programmability similar to that found in database packages. Most authoring tools define a screen and the specific attributes of the screen such as the definition of a video window that will play a specified video clip or show a text file or a graphic image.

SUMMARY OF THE INVENTION

The present invention provides a multimedia kiosk authoring system for use in developing and maintaining multimedia kiosk systems. The authoring system enables the user interface for each individual kiosk to be customized quickly and easily within wide limits of variation, yet subject to constraints adhering the resting interface to good standards of aesthetics and user friendliness. The system may be used to provide custom interfaces expeditiously even for hundreds of kiosks. The authoring system also provides for organization of information from numerous information sources, referred to herein generally as information providers. The system makes it easy to set up, maintain, and update a great variety of kiosks with large amounts of information potentially available to each kiosk. Each kiosk, however, is customized to present only the information that is appropriate to that kiosk. When a new information provider subscribes to the system, it may easily be incorporated into the system so that it is available for all kiosks. All individual kiosks may have available to them the entirety of the latest information. The present authoring system avoids the need to keep track of different versions in the field at potentially hundreds of kiosk sites.

The present authoring system is particularly advantageous in that it may be used by persons with little or no experience in the intricate details of computer programming thereby making it easier for a larger number of persons to set up kiosk interface screens. It is a further advantage of the present authoring system that an individual using the authoring software to devise a kiosk interface screen (that individual is referred to herein as a "system author") is only given a limited range of choices for stylistic and functional elements appearing in the screen displays. In this way major aesthetic or functional design choices such as button syles and sizes, window borders, color combinations, and type fonts as well as hierarchical methods of retrieving information may be built into the system taking into account the considered opinions of aesthetic design specialists, database specialists, and academic studies on public access kiosk systems and user preferences and problems. Only a limited range of pre-defined design choices is then made available to a system author. Nevertheless, the authoring software is structured to make it amenable to change for example to permit new elements to be added to the system or to take into account the results of new studies on user interactions with computer kiosks.

Other aspects, advantages, and novel features of the present authoring system are described below or will be readily apparent to those skilled in the art from the following specifications and drawings of illustrative embodiments.

DETAILED DESCRIPTION OF ILLUSTRATIVE EMBODIMENTS

Figure 1:
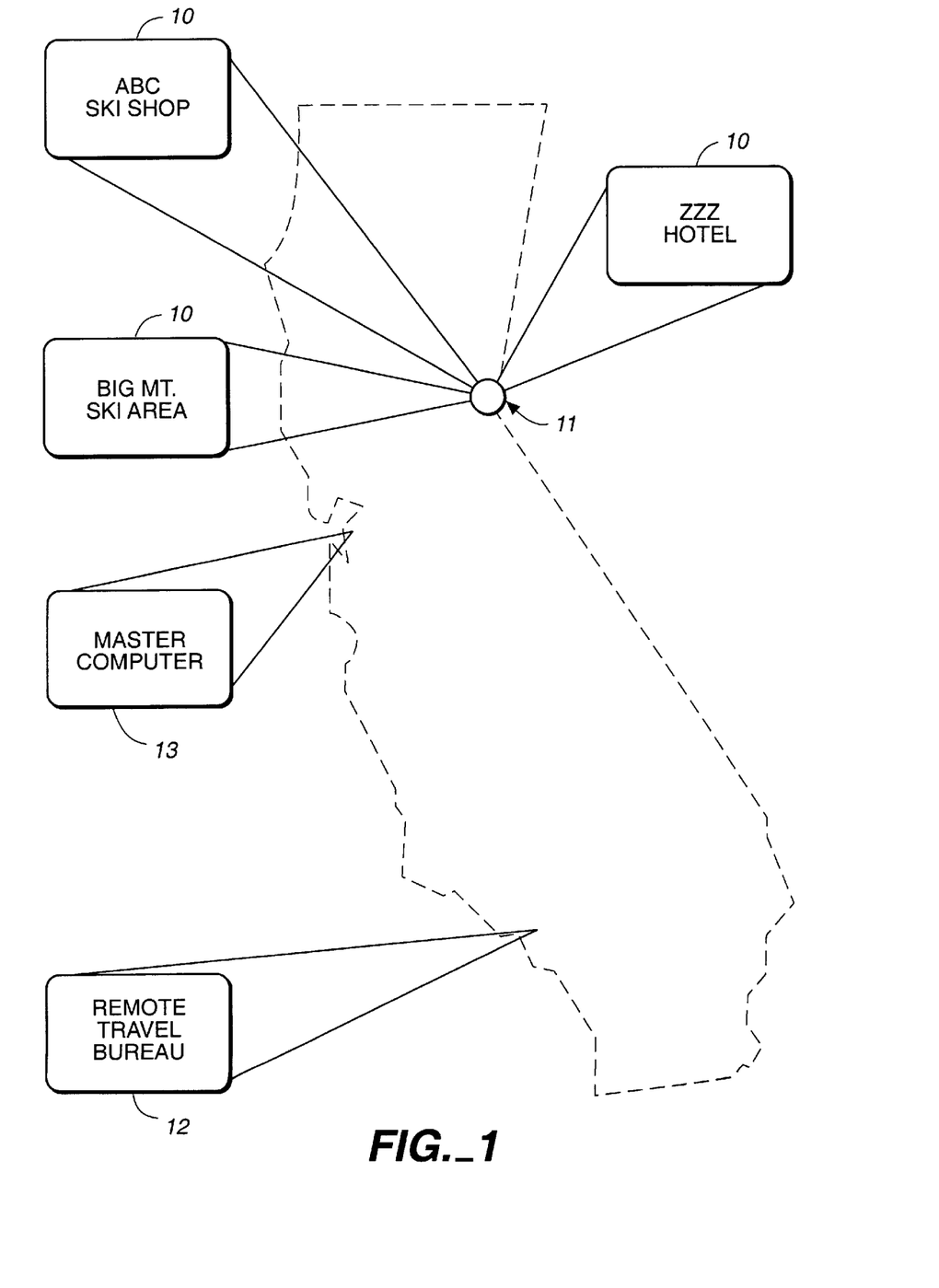
FIG. 1 is a diagrammatic representation of a distributed kiosk system for implementing the present invention.

For purposes of illustration an embodiment of the present invention is described in a distributed kiosk system serving a geographical region popular for skiing. FIG. 1 shows three representative kiosks 10 located in a ski shop (the "ABC Ski Shop"), a ski area (the "Big Mountain Ski Area"), and a hotel (the "ZZZ Hotel"), all located in a geographical region indicated generally at 11. FIG. 1 shows a representative geographical region situated in the ski country of Northern California. The system is not limited to small numbers of kiosks, but may include hundreds or thousands of kiosks serving a number of localized geographical regions. Indeed, many of the features of the invention are especially advantageous in such large and widely distributed systems. The system may also include remote and isolated kiosks such as kiosk 12 located in a travel bureau removed from ski country 11. The embodiment of FIG. 1 includes a master computer 13 at yet another location that may be used for software implementation of new subscriber kiosks on the system and maintenance of old kiosks.

Kiosks commonly take the form of dedicated stand-alone stations having a display screen that may be a touch screen and/or may be used with a keypad. In some settings, however, a self-contained stand-alone kiosk would be out of place and the function of the kiosk may be served equally well by a desktop computer with a touch pad or mouse or even a keyboard. For example, kiosk 12 of FIG. 1 in a remote travel bureau may take the form of a desktop computer in the travel bureau office. "Kiosk" is used herein in this broad sense to include stand-alone kiosks as well as general purpose computers configured to serve the same functions as a stand-alone kiosk. As configured in the present system each kiosk also includes its own data storage capability such as a high volume hard disk drive, although the system could operate from a central database server such as master computer 13 in FIG. 1 when suitable bandwidth for communications with the many kiosks is available. As will be described below, if the system is not implemented with a central database server, it is advantageous for each kiosk to store the entire database of information for all kiosks in the system even though each kiosk will not generally use the entire database.

Hardware implementations of a kiosk as a stand-alone unit with a touch screen or keypad are well known and need not be described in detail here. Of more significance to the present invention is the method by which the software for the kiosk units is configured.

Figure 2A:
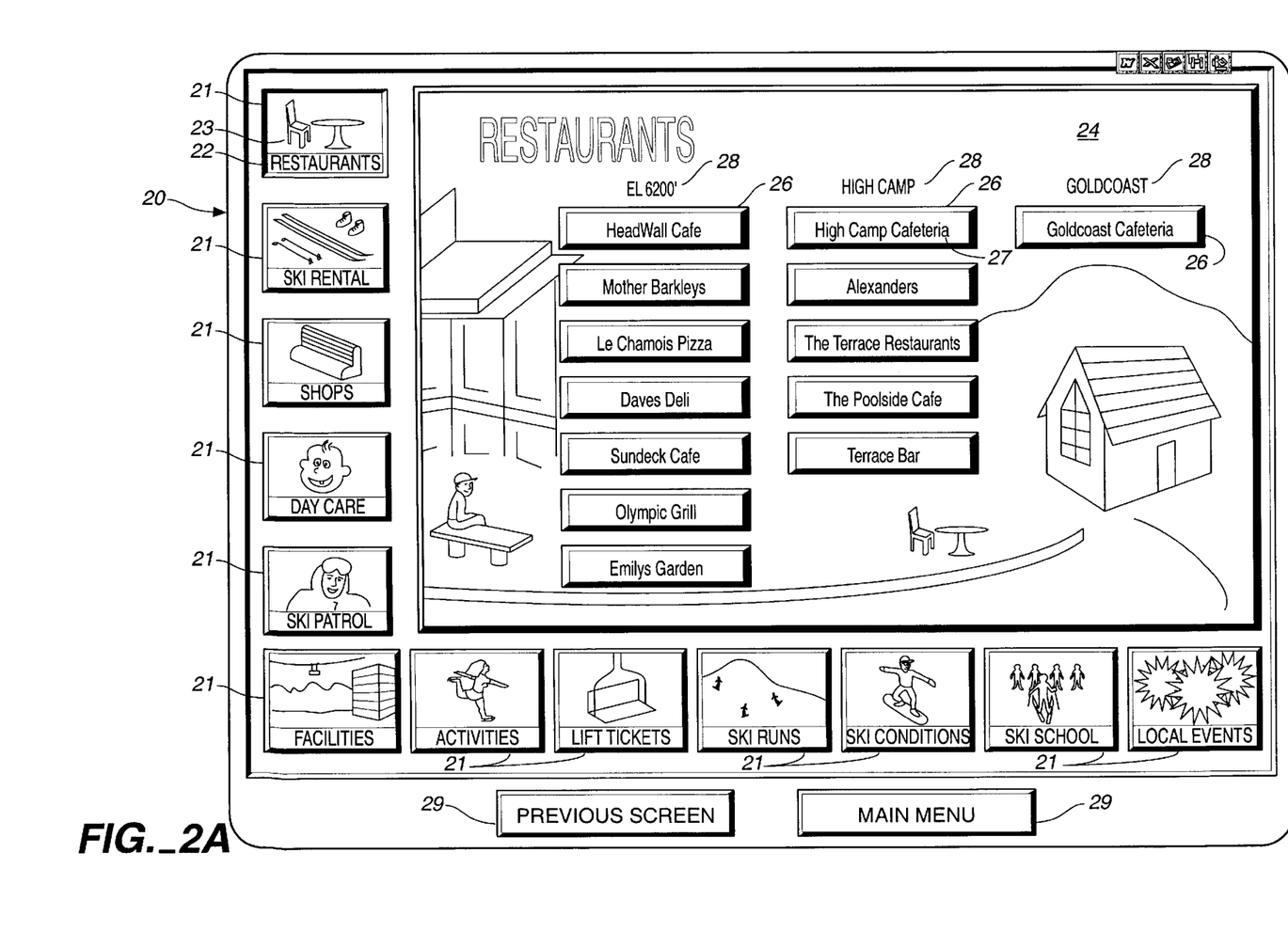
FIGS. 2A and 2B are examples of kiosk screen display layouts.

Before the software is described in any detail, it is instructive to look at examples of kiosk screen layouts designed by the authoring system of the present invention. FIG. 2A shows a representative layout of a display screen 20 from the ABC Ski Area kiosk 10 that is rich in structural details. One column and one row of buttons 21 of a first type are disposed along two edges of the screen. Each button 21 has a textual portion 22 with text identifying a category of information and a graphics portion 23 showing a graphical image appropriate to the associated information category. The bulk of the screen is occupied by a main window 24 that has a variable display. When the kiosk is not in use, window 24 may display a primary scene from the ski area with overlaid text identifying the area and perhaps giving instructions for use. When a user activates a buttons 21, main window 24 displays information about the topic associated with the button. In FIG. 2A the user has activated the restaurant button in the upper left corner of the screen. Main window 24 displays a background graphical image of an attractive scene from the ski area overlaid with three columns of buttons 26 of a second type with textual labels 27 identifying restaurants and other eating establishments available at the ski area. Also overlaid on the background image in main window 24 are textual labels 28 identifying the general locations of the eating establishments. At the bottom of the screen are additional screen maneuvering buttons 29. For purposes of illustration in FIG. 2A the graphical images on buttons 21 and in main window 24 are shown only in diagrammatic format. The authoring software can insert a variety of image types at the selection of the system author such as photographs, artwork or even video clips.

A closer look at the structure of the screen layout of FIG. 2A is in order. The buttons 21 have a fixed predefined size, which is chosen not only to make them aesthetically pleasing in appearance, but also easy to use on a touch screen by persons generally unpracticed with touch screen operation. The button placement in FIG. 2A is generally fixed along two adjacent edges. This is an aesthetic choice, but it is a choice that is forced by the authoring software to assure that once an aesthetically and functionally acceptable button size and layout has been chosen, it will be maintained throughout all further screen layouts for all kiosks without having to expend time and effort re-creating an acceptable button layout anew for each kiosk. Other aesthetic button layouts may also be used, but once a general button layout is devised, the software makes it available for use in all kiosk interface screens. Considering that many many screen layouts will generally have to be set up and then regularly revised, limiting the system author's freedom to devise new button patterns and button styles greatly enhances the ease with which new kiosks may be brought in operation and ensures that the button pattern will be aesthetically and operationally acceptable.

The screen layout of FIG. 2A shows twelve buttons 21 of the first type. If a kiosk screen calls for fewer buttons, then the spacing between the buttons is automatically adjusted, but the button size and row and column placement are unaltered. If the screen calls for more buttons, then one button on the initial screen is a "MORE" button activating display of additional buttons, which will then include a "BACK" button for return to the previous display of buttons. This is an example of a control built into the authoring software to ensure that the buttons cannot be made too small so as to impair their readability or ease of use.

Figure 2B:
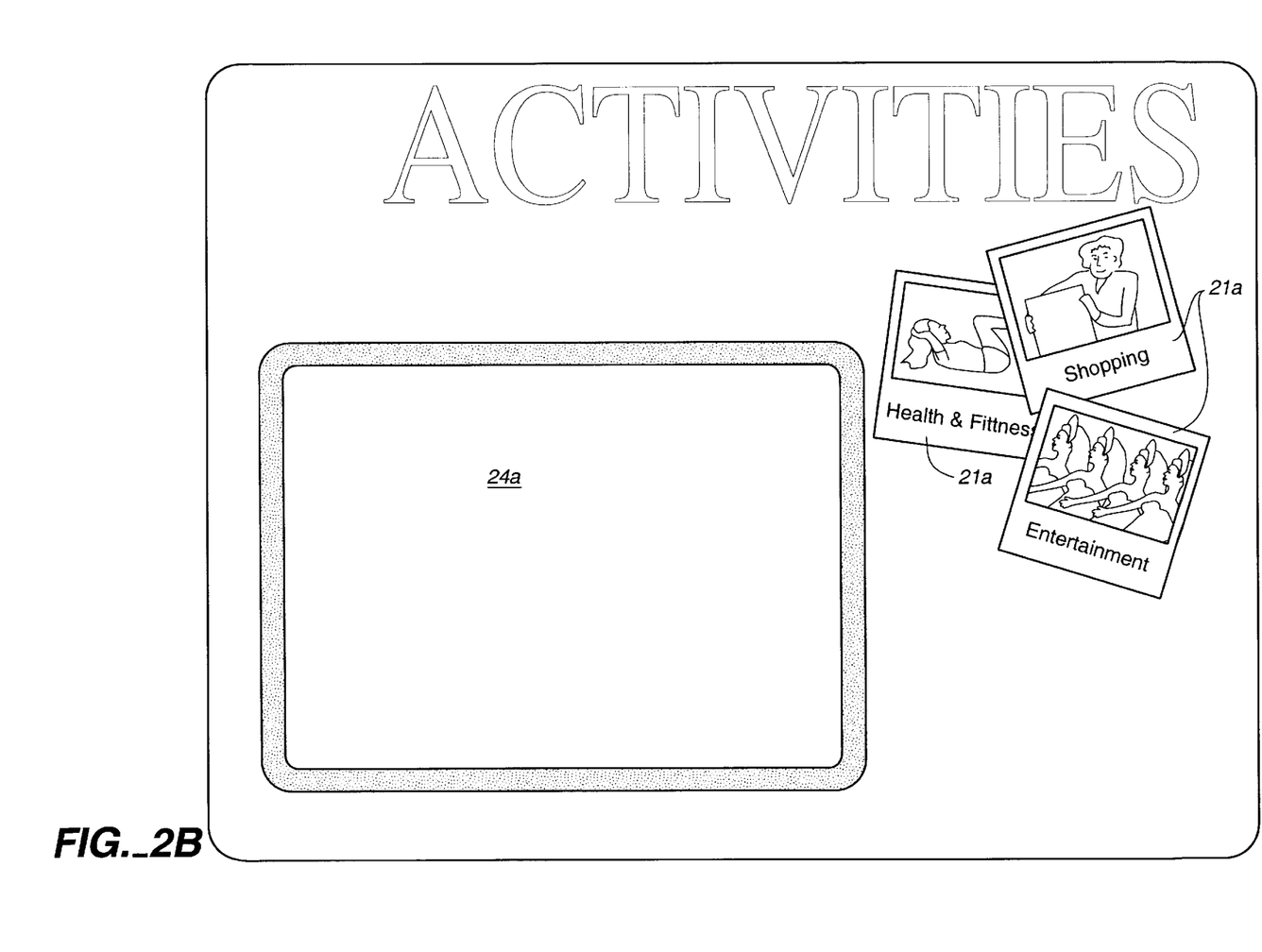

Notwithstanding the frequent advantages of the fixed geometric button placement as in FIG. 2A, an alternative free button placement is also provided as illustrated in the screen layout of FIG. 2B. This is particularly beneficial when only a few buttons 21 are to be displayed. FIG. 2B shows an alternative screen layout with a main window 24a and three buttons 21a of the first type positioned at coordinates and in orientations specified by the system author. The buttons 21a activate associated displays in main window 21a.

Having described the appearance and basic functionality of example kiosk interface screens, a more detailed description is now given of an implementation of the authoring system according to the invention. A given screen will include a variety of elements for presentation to a user such as one or more windows, one or more background images or artwork for providing a backdrop for a window or for background within a window, a number of buttons, a number of "hot spots," i.e., areas on the screen for activating actions, text strings, video clips, audio clips, slide sequences, or animation sequences. These elements are grouped into element types. For example, there may be several styles of buttons, each style constituting a button type, or there may be several styles of windows, each constituting a window type. Thus, the element types may include one or more button types, window types, text types, video types, and so on. Buttons and hot spots are sometimes referred to herein collectively as activation sites, and button types and hot spot types are sometimes grouped together herein as examples of activation types.

The authoring system uses the methods of object oriented programming. The system is specified by the following Object Class Definition Tables. The entries in these tables follow customary object oriented programming nomenclature and will be readily understood to those skilled in the art of object oriented programming. The particular implementation described here was developed for the Microsoft Windows® platform using the Microsoft Software Developers Kit (SDK) and that nomenclature is followed here. The classes used here are derived from or supplement classes provided by Microsoft SDK.

| CLASS DEFINITION TABLES | | |
|---|---|---|
| Project Class: | | |
| Attibute Type | Attribute Name | Description |
| long | IProjectID | Project ID |
| CString | sProjectName | Project Name |
| long | IHomeScreenID | ID of the Home Screen for the Project-not known initially |
| CString | sHomeName | Name of the Home Screen |
| Screen Class: | | |
| Type | Name | Description |
| long | IScrnID | Screen ID |
| CString | sScrnTitle | Screen Title |
| CString Name | sScrnBkgnd | Screen Background - File |
| long | IScrnColor | Screen Color |
| long | IProjectID | Project ID |
| long | IParent | Parents ID |
| long[ ] | IChildren[ ] | Array of Children ID's |
| int | nTransition | Transition effect for screen to screen |

CLASS DEFINITION TABLES

| Type | Name | Description |
|---|---|---|
| CString | sVoiceOver | Voice Over file name associated with screen |
| CString | sHelpFile | Help File name associated with the screen |

Control Class:

| Type | Name | Description |
|---|---|---|
| long | lScreenID | Screen ID; every control is associated with a screen |
| long | lCtrlID | Control ID; every control has a unique ID |
| long | lForeColor | Foreground Color; foreground color of the control |
| long | lBackColor | Background Color; background color of the control |
| long | lLink | Link; ID of screen to which control is linked |
| WORD | wTransition | Transition; #define describing screen transition effect |
| POINT | ptControlLt | Upper left hand corner of control |
| POINT | ptControlRt | Lower left hand corner of control |
| WORD | wHeight | Control Height |
| WORD | wWidth | Control Width |
| double | dRotate | Angle of control in radians |
| BOOL | bAuthor | Author Mode (T) Authoring (F) playback engine |
| BOOL | bAction | Action; specifies if a control has an action (T) or a Link (F) |
| long | lAction | Action ID; a #define describing the Action |

Button Class:

| Type | Name | Description |
|---|---|---|
| WORD | wButtonType | Type of button |
| WORD | wFrameStyle | Frame Style |
| long | lFrameColor | Color of the frame |
| WORD | wFrameSize | Frame size in pixels |
| CString | sTitle | Title of button |
| WORD | wLocation | Location of title on button |
| long | lTitleColor | Color of the Button Title |
| CString | sFont | Font Name |
| BOOL | bBold | Font Attrib - Bold |
| BOOL | bItalic | Font Attrib - Italic |
| WORD | wPtSize | Font point size |
| long | lDropColor | Drop Shadow Color |
| WORD | wDropSize | Drop shadow size |
| CString | sFile | File Name for image (if one used) |
| CPoint | ptPictLeft | Upper left hand corner of Image |
| Cpoint | ptPictRight | Lower right hand corner of image |
| WORD | wWidth | Width of image |
| WORD | wHeight | Height of image |
| WORD | wState | Button State |
| int | nYOffset | Image Y Offset |
| int | imghandle | Handle to the image |

Text Window Class:

| Type | Name | Description |
|---|---|---|
| HWND | hWndTextWin | Handle to a CRichEditTextControl |
| CRECT | cRectWin | Coordinates of the Window |
| CString | sTxtFile | Name of the RTF to display |
| long | lBkColor | Background Color of the control |
| LOGFONT | lfText | Provide a LOGFONT if text is not tb displayed as it is stored in the RTF File. |
| BOOL | bBorder | Display Window Border |
| DWORD | dwStyle | Window Styles |
| DWORD | dwBorder | Border Style |
| BOOL | bTransparent | Display the Text Transparently with no Frame, etc. on the parent window |

Text Object Class:

| Type | Name | Description |
|---|---|---|
| Cstring | sText | Text to display |
| CPoint | ptText | Upper Lt Coordinate of Starting Location to Display Text |
| double | dRadian | Angle if any to display Text |
| DWORD | dwEffect | Effect to use to Display Text |
| LOGFONT | lfText | LOGFONT structure to be used to display the Text |

Audio Object Class:

| Type | Name | Description |
|---|---|---|
| CString | sWavFile | Name of the WAV File to play. A wav file is assumed but other audio file formats like MPEG, AVI, are supported. The file type is based on the file extension. |
| WORD | wDelay | Delay as to when to start the Audio |
| BOOL | bRepeat | Set to true to replay the Audio clip when complete |
| BOOL | bVolControl | Set to true to allow user to alter Audio & even mute Audio. |

Video Object Class:

| Type | Name | Description |
|---|---|---|
| CString | sVideo | Name of the video file to play. Again, the Video type is determined by the files extension. |
| CRect | cRectWin | Rectangle of where to place the Video Window. |
| BOOL | bRepeat | Set True to Repeat the Video when complete |
| BOOL | bAudio | Set True to play Audio |
| UINT | uiEffects | Effect to play between Clips |
| BOOL | bMultiple | Set to true if there are multiple clips to play specified in CString. If there are multiple clip then CString is a file with a list of ciip names. |
| BOOL | bBorder | Set to True if there is a Border |
| DWORD | dwBorderStyles | Style of Border to use on the Video Window |
| BOOL | bOpen | Set to True if we should provide File Open Capability. |
| BOOL | bControl | Set to Ture if MCI control functionality is provided, such as a slide bar, repeat, stop. |

-continued

CLASS DEFINITION TABLES

Animation Object Class:

| | | |
|---|---|---|
| CString | sAnimation | Name of the animation file to play. Again, the Animation type is determined by the files extension. |
| CPath | cPathAnim | Path of the Animation |
| BOOL | bRepeat | Set True to Repeat the Video when complete |
| BOOL | bAudio | Set True to play Audio |
| BOOL | bMultiple | Set to true if there are multiple clips to play specified in CString. If there are multiple clip then CString is a file with a list of clip names. |
| DWORD | dwBorderStyles | Style of Border to use on the Animation Window |

Image Object Class:

| | | |
|---|---|---|
| CString | sImage | Name of the Image file to display. Again, the image type is determined by the file extension. |
| BOOL | bBorder | |
| DWORD | dwStyle | Image Style Attributes, like border size, border color, Drop Shadow, Transparency |
| CPoint | ptUpperLt | Upper Left Corner of the Image |
| UINT | uiWidth | Width of the Image |
| UINT | uiHeight | Height of the Image |
| double | dAngle | Angle to display the Image |
| CRECT[ ] | rectHot | Array of Rect Hotspots in the Image |

Slide Object Class:

| | | |
|---|---|---|
| CString | sFiles | A File containing the images to display in the slide window. |
| BOOL | bDistort | Set to true if Images can be distorted when displayed |
| BOOL | bBorder | Set to True if the Object has a border |
| DWORD | dwStyles | Sets the Objects Styles, such as border size, border color, Forward and Backward Buttons provided |
| UINT | uiDelay | Delay between slides |
| Cpoint | ptUpperLt | Upper Left Corner of the Image |
| UINT | uiWidth | Width of the Image |
| UINT | uiHeight | Height of the Image |
| double | dAngle | Angle to display the Image |

Nav Object Class:

| | | |
|---|---|---|
| CString | sFile | Name of the Nav File |
| CRect | cRectWin | Rectangle of location for control |
| BOOL | bBorder | Set to True to display a border. |
| DWORD | dwStyles | Styles for the Control, like border size, border color |
| CRect[ ] [ ] | cRectNav | Array of Hotspots for the Nav, Store X and Y for Hotspots. The frames will be determined on the fly. |

The project class defines the types of pre-established projects that are available to be implemented on a kiosk system. "Project" here refers to a kiosk system implementation devoted to a specific theme; for example, the kiosk system based on a skiing theme illustrated here is an example of a ski implementation and constitutes one project. Other projects could be for example a golf project or a mountain biking project. In short, "project" refers to a grouping of a series of screens with a common theme. A project is associated with a home screen with which a full set of screens for the project is linked.

The screen class is associated with all the controls for a given screen. All the classes are derived from the control class, which defines the common attributes that all classes may share. The attribute "bAuthor" in the Control Class Definition Table defines two modes of operation. In the author mode a sysem author can manipulate the various elements to be placed on a screen, such as placing buttons or editing attributes within the permissible attribute ranges. In the playback mode the system author can play back the current configuration of a screen as it will be presented to a user. Note in the Control Class Definition Table that since the defining points for controls do not have to be rectangular, points may be used to support non-rectangular objects. The button class is derived from the control class. For the text window class the control is derived from a CRichEditTextControl class, which is a class provided with the Microsoft Windows SDK. This class handles predetermined logic for handling rich text format (RTF) text such as word wrapping or font selection. In this table "LOGFONT" refers to a structure provided by Windows SDK for defining a font and its attributes. The attribute "bTransparent" enables the system author to display text in a window without displaying the window itself. That is, the window is transparent, the text is not. This provides an alternative means of formatting text other than using a text object. Using a transparent window makes it easier to format large amounts of text to control word wrap, highlighting and the like. The use of RTF format can be convenient for example to display text with predetermined characteristics. For example, it may be desirable to display a ski report with a standardized font with keywords (e.g. Excellent Conditions, Poor Conditions, Warning) highlighted or offset in different colors. Through this class the format for presentation may be pre-established for the system author. In the Text Object Class Definition Table the attribute "dwEffect" refers to the choice of dynamic transitioning effect (fading and the like) to be used, if any, when the text is first displayed on (or removed from) the screen. The audio object class is used for presenting audio clips to the user. The table entry "wDelay" refers to the delay before an audio clip begins to play after a kiosk user activates it. In the Video Object Class Definition Table the entry "uiEffects" refers to a dynamic transitioning effect to activate between between video clips when more than one video clip is to be played sequentially or one video clip is to be repeated. The entry "bOpen" refers to the ability of a kiosk user to open a video clip by activating an activation site on a screen. The entry "bControl" puts up a media control interface including buttons and slide bar for a kiosk user to start, stop, and fast-forward and back within a video clip. In the Animation Object Class Definition Table the entry "cPathAnim" defines a stored array of points defining a locus for an animation sequence to follow across in display screen as the sequence progresses. For example, an animation sequence could move along an elliptical path as the clip is played. The image object class defines image objects to be used as stills for backgrounds or for foregrounds, for example, a product image such as a ski boot and images to be used as part of a sequence for slide presentations. The nav object class refers to navigable objects. For example, a kiosk user may be permitted to navigate an image of a product such as a ski boot. The boot is stored as a series of still images from different angles collected together in an array. A kiosk user may activate controls to look at the front, side or back of the ski boot.

The authoring software includes the capability of including hot spots in a navigable object so that the user may obtain further information or activate further screens. For example, a buckle on the ski boot may constitute a hot spot that the user can activate to get more detailed views of the buckle or to activate a video clip of the operation of the buckle. To make it easier and quicker for a system author to define such hot spots, the authoring system proceeds as follows. A region to be designated a hot spot is defined on only one image, referred to herein as "hot spot defining" image. If a further hot spot to be defined is not visible in the first hot-spot-defining image, then a second image will also be designated a hot spot defining image. The hot spot locations on the hot spot defining image or images are stored in a lookup table. When the user rotates a view (that is to say, progresses to a further image in the navigable sequence) and attempts to activate a region on the rotated view, the software operates to back track to the hot spot defining image from which the current image unfolded and looks up the coordinates for any hot spots defined in that image. The appropriate action is then taken. This procedure represents a considerable savings for the system author in a kiosk system having hundreds of kiosks and many navigable objects. It is not necessary for the system author to define separate hot spots on each image in an array making up a navigable object.

Figure 3:
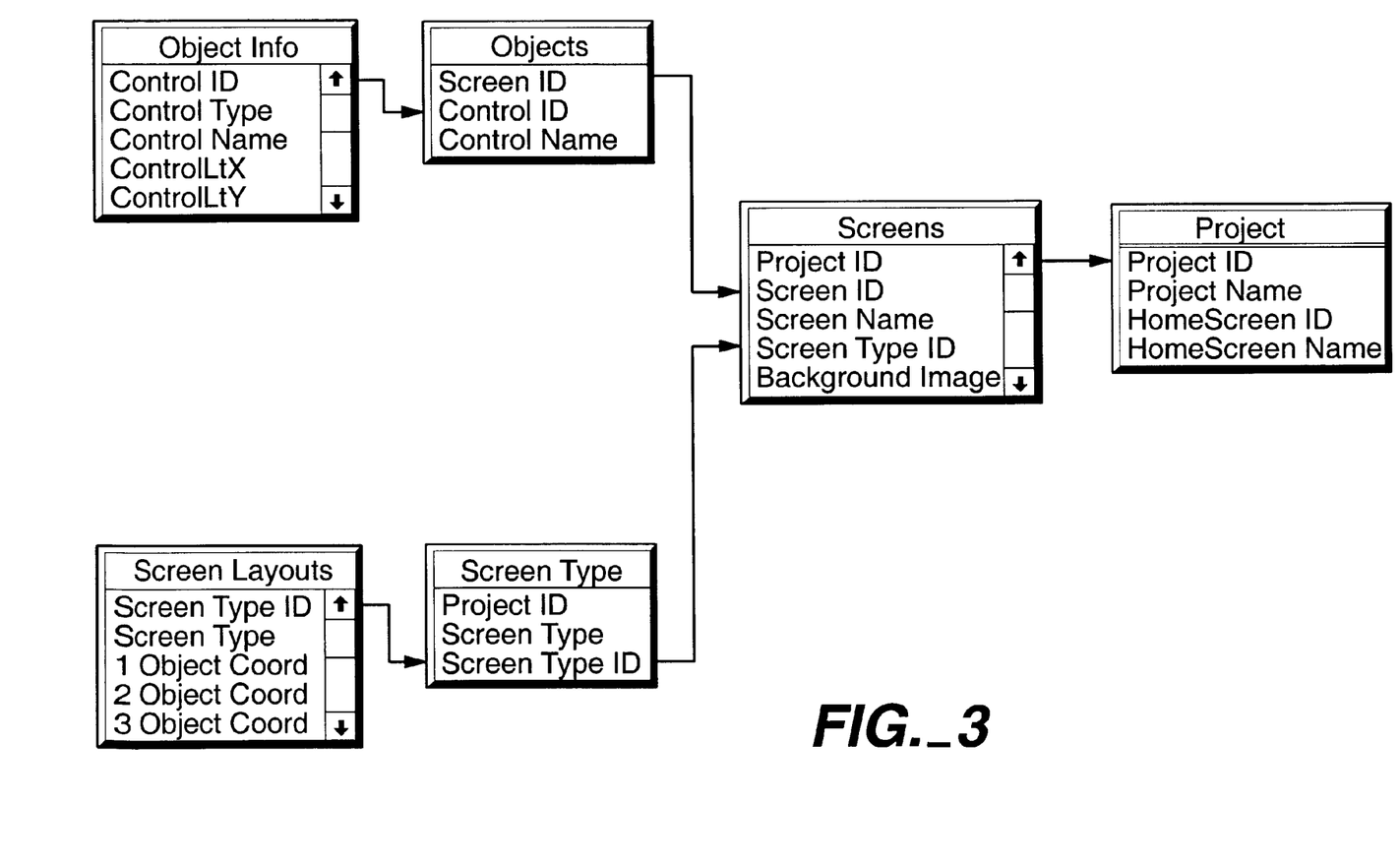
FIG. 3 is an example of a screen layout joined table for implementing a kiosk authoring system of the present invention.

The interrelations amongst the object classes in a system implementation is shown the joined tables of FIG. 3. This series of tables describes the relationship of a project, the screens, and the screen objects. The screen layout tables also define screen types and the locations at which objects appear on screens of given type. For example, a screen of type 1 will have its own associated screen definitions with one object to a pre-defined limiting number N of objects. A screen of type 1 may then be defined having from one to N objects and the objects will always be placed appropriately. Some example tables will now be discussed.

Project Table

The project table contains a unique project ID, the project name, the home screen ID and the Home Screen Name. All screens in the system are necessarily linked to a specific project. Example:

Project ID: 004989788
Project Name: Ski
Home Screen ID: 004000001
Home Screen Name: HomeScreen The project ID is used to link the project to the screens comprising the project.

Screen Table

The screen table contains a unique ID for a screen in a project. The screen is linked to a project by the Project ID. The Screen Table contains a Project ID, Screen ID, Screen Name, Screen Type ID and other screen attributes. The Screen ID is used to link a screen to objects on the screen; the Project Id is used to link a Screen to a Project; and the Screen Type ID is used to link a screen to a screen type. Each screen will have a screen type. A screen type is a template that describes the permissible layout for a screen. If a screen has a Screen Type ID, the screen is linked to a Screen Layout which will define the screen look. Example:

Project ID: 004989788
Screen ID: 004000001
Screen Name: HomeScreen
Screen Type ID: 0000500061

This screen is part of the Project Specified by the Project ID and has a screen type that includes "Lower Buttons" in this example. While that is not expressly given in the screen table, it is apparent by reference to the screen type designated by Screen Type ID 0000500061. The objects associated with this screen are then read from the screen type and are placed on the screen as described by the Lower Button Screen Template.

Object Table

The Object Table contains a Screen Id, which identifies the screen the object is associated with, a Control ID, which defines the type of object and the attributes associated with the object. Example:

Screen ID: 004000001
Control ID: 0000000001
Control Type: Video Window

This Video Window object is associated with the Screen identified by the Screen ID and has the attributes that are defined in the Object table. The control is linked to the object table via the Control ID.

Object Info Table

The Object Info Table contains a Control ID and other control attribute information. It is associated with an object via its Control ID. Example:

Control ID: 0000000001
Control Type: Video Window
Control Name: HomeScreen Video The Object Info Table provides the attributes associated with an object. In turn the object is associated with a screen via the Screen ID.

Screen Type Table

The Screen Type Table defines a screen type and the project with which this screen type is associated. The Project ID is a unique ID specifying the project to which this Type of screen is attached. The Screen Type ID specifies a specific screen type template. Example:

Project ID: 004989788
Screen Type: Lower Button
Screen Type ID: 0000500061

The Screen Type is a predefined screen layout that can be used to dynamically build an interface.

Screen Layouts Table

The Screen Layouts Table defines the possible layouts for a screen type. It will contain several options for the look of the screen under different circumstances. The Screen Type ID links the screen layouts to a screen type. Example:

Screen Type ID: 0000500061
Screen Type: Lower Button
1 Object Coordinates: Rect

The Screen Layout table defines the different appearances available for a screen. The Screen Type Lower Button has a layout that contains the layout for one Button Object, two Buttons Objects, etc. The system author can then determine how many object are to be placed on a screen and what the screen type is and pick the appropriate coordinates and place the objects on the screen in a predetermined functional and aesthetic format.

By way of summary, a kiosk user interface authored using the present system includes of the following components: a project component, a screen component, and a screen object component including buttons, hot spots, video, audio, text, windows for video, audio, text, animation. The project component stores data about the program along with a link to a list of screens in the program as well as the project name and ID. The screen component stores information about a specific screen. A screen can contain a background image or solid color, text, a textual reference to the screen, a screen ID, and the IDs of the parent screen and any child screens. This arrangement in effect forms a doubly linked list that allows the system to be displayed in a hierarchy as well as to be navigated in a linear fashion when desirable.

The screen component contains a screen object definition file that defines the objects to be placed on the screen. The procedure is as follows. The first field in the data structure is the Boolean field bMath. If bMath is TRUE, then the object locations are ignored and the objects are placed according to a mathematical formula. This is carried out as follows. First get the kiosk ID from the definition file. Each subscribing client has an ID, and each of the client's kiosks has an ID. Using the unique kiosk ID perform a lookup for data pertinent to the screen. For example, if the kiosk is at the ABC Ski Shop and the screen is for X Company ski boots, perform a lookup to see what X Company boots the ABC Ski Shop carries. Each time an X Company ski boot carried by the ABC Ski Shop is found, a counter is incremented. Once the lookup has traversed the system, the counter will give the total count of X Company boots at the ABC Ski Shop. Based on this count, a calculation is then made to determine where the total count of objects should be placed on the screen. For example, determine the width and height of the screen and divide each by the total count of objects to determine the space to be allocated to each object. Then calculate (or lookup) the screen coordinates positioning each object along the lower edge of the screen or, if there are more than, say, seven objects, the lower edge and the left edge of the screen.

If bMath is FALSE, then the objects are to be placed in predefined locations. The database is traversed as before to determine how many objects are to be placed on the screen. However, now a screen definition table defines where the objects equal in number to the total count are to be placed. In this mode the object locations are predefined.

Once the object locations are determined, the entries in a database specify the text and/or pictures associated with the objects. The object may then be labeled and drawn. Pseudocode describing this interface is given in Table I.

TABLE I

```
<Entering new screen - get screen ID passed in as a parameter>
Based on Screen ID, look up the screen's object definition file
if bMath
    perform lookup on screen ID to get Lookup Value <e.g.,
        X Company ski boots>
    Once the lookup key is obtained
        Read the system ID
        Perform a database lookup based on system ID and lookup
            key <e.g., ABC Ski Shop AND X Company ski boots>
        Traverse the system ID looking for lookup keys
```

TABLE I-continued

```
        Count the matching items
    Once all objects to be placed on the screen have been obtained
        Calculate the object locations
            Get screen width
            Get screen height
            based on screen width determine x coordinate of first
                item
                Screen Width = 1024
                There are six objects
                1024/5 = 205
                Ideal sizing = 167
                Calculate proper spacing across screen using
                    objectWidth = 167
    Once all object locations are defined
        perform lookup in the database using system ID and lookup
            key
            With match   get "Object Text"
                         get "Picture"
                         get "Video"
                         get "Action"
    Once the object characteristics are obtained
        Label and draw the object
else
    Perform lookup on screen ID to get Lookup Value <e.g.,
        X Company ski boots>
    Once the lookup key is obtained
        Read the system ID
        Perform a database lookup based on system ID and lookup
            key <e.g., ABC Ski Shop AND X Company ski boots>
        Traverse the system ID looking for lookup keys
            Count the matching items
    Once all objects to be placed on the screen have been obtained
        Perform a lookup to get the predefined object locations
            <predefined object locations will depend on the
            number of items>
    Once all the object locations are defined
        Perform lookup in the database using system ID and lookup
            key
            With match   get "Object Text"
                         get "Picture"
                         get "Video"
                         get "Action"
    Once the object characteristics are obtained
        Label and draw the object
```

To implement the kiosk system, a database of all information to be displayed at any individual kiosk is constructed. The database is formed using standard database methods and software. In the illustrated embodiment Btrieve database software was used to create and maintain the database. The method of the invention is implemented so that other commercial database software products could readily be substituted for Btrieve. The authoring system of the present invention then allows each kiosk to be customized quickly and easily while maintaining a high degree of variability in the screen layouts without sacrificing aesthetic appearance. Unlike authoring systems of the prior art, which generally create a specific version of the software for each kiosk, the present authoring system uses the same software at each kiosk, but merely redefines definition tables to configure an individual kiosk. The definition tables can be redefined at the kiosk site or remotely from master computer 13. In this way for example when a ski shop stops providing one ski line and substitutes a competitor's ski line, it is only necessary to change a definition table to update the kiosk interface. No change in the software is called for.

Figure 4:
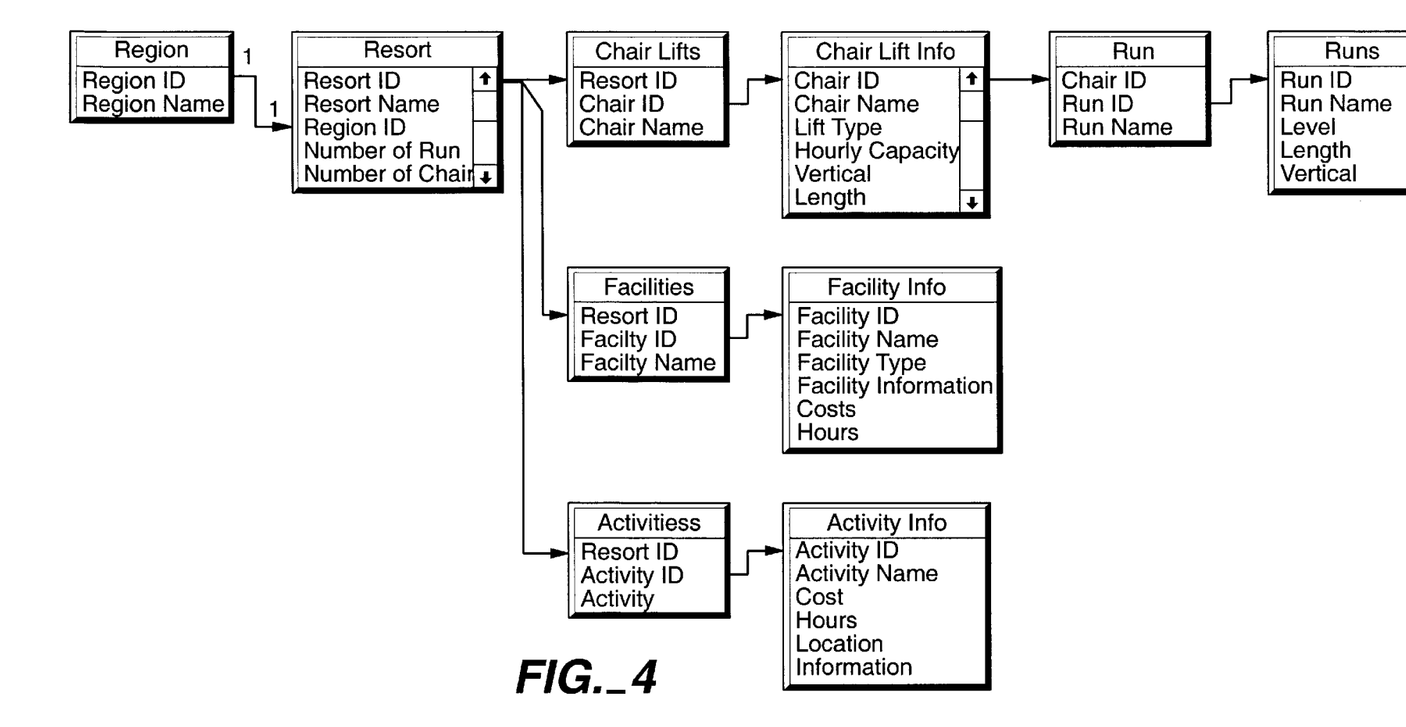
FIG. 4 is an example of a Region/Resort database joined table.

A description is now given of the organization of the database of information available to be displayed on a kiosk screen in the example of FIG. 2A. FIG. 4 shows an example of a joined table structure that is used to describe the category of resorts. The joined table is a series of related tables describing the resorts and their offerings. By using the information in these tables in conjunction with the information in Screen Layout tables discussed above, a system author can create a user interface on the fly, i.e, in real time, instead of having to pre-define each screen specific to each kiosk. For example, to prepare the user interface for a kiosk in the California Region, one performs a lookup in these tables using the database software to determine the resorts in the database for California. This gives a count of the number of resorts in the California region, which may then be laid out on the screen. Performing lookups through the joined table structure provides information for developing the further hierarchical screen layout including information for each resort, ski runs, rental shops, restaurants and the like.

We turn now to a description of the individual tables making up the joined table of FIG. 4.

The Region Table

The region Table provides a unique Region ID as well as a Region Name. The Region ID is a unique long integer. Any scheme may be used for defining IDs occurring in this and all the other tables of the database. The Region Name provides a descriptor for the Region. Example:

Region ID: 000909100

Region Name: California

Region ID: 000800101

Region Name: Pacific North West

All resorts are associated with a region. One performs a lookup of the number of Regions in the system to determine how many buttons should appear on the Region Screen. To place the buttons on the screen, either a screen layout associated with a predefined screen type may be used or a mathematical formula may be used to position a standard button along the bottom or side of the screen as in FIG. 2A.

Resort Table

The Resort Table provides a Unique Resort ID, a Resort Name, a Region ID, and other information about the resort such as the number of chair lifts, the number of Runs, whether the resort has other Facilities or Activities. The Resort ID is a unique identifier for a specific resort, and the Region ID defines an association provided through a join to a Region. As implemented here, all resorts are found within one Region. The rest of the information in this table gives general information about the resort. Example:

Resort ID: 000909190

Resort Name: Big Mountain Ski Area

Region ID: 00909100

Number of Runs: 110

Number of Chairs: 34

Facilities: True

Activities: True

This information is used to determine the screen layout. If a Region has four resorts linked to it, then the screen will have four corresponding button objects. As indicated above, the button objects can be placed on the screen either by mathematical formula giving screen coordinates or by screen type. If the Resorts screen has a screen type associated with it, then the screen layout will be looked up based on the number of Resorts associated with a Region.

Chair Lift Table

The Chair Lift Table provides a Unique Resort ID, a Chair ID and a Chair Name. The Resort ID links the Chair Lift to a specific resort and the Chair ID links the Chair to a record in the Chair Lift Info table. The Chair lift Name provides the common name of the lift. Example:

Resort ID: 000909190

Chair ID: 000000001

Chair Name: Siberia

Chair Lift Info Table

The Chair Lift Info Table provides a Unique Chair ID, a Chair Name and other information about the chair such as vertical rise and terrain served. Example:

Chair ID: 000000001

Chair Name: Siberia

Lift Type: Express Quad

Hourly Capacity: 2600 Skier/hour

Vertical: 1600'

Length: 5000'

Terrain Served: Intermediate/Advanced

Run Table

The Run Table provides a Chair ID and a Unique Run ID as well as the Ski Run name. The Chair ID links this run to a chair and the Run ID links this run to more extensive information about the run. Example:

Chair ID: 000000001

RunID: 001000100

Run Name: The Wall

Run Info Table

The Run Info Table provides a Unique Run ID, a Run Name and other information about the Runs. The Run ID links a run record to a specific run. Example:

Run ID: 001000100

Run Name: The Wall

Level: Advanced

Length: 5000'

Vertical 1600'

Facilities Table

The Facilities Table provides a Unique Resort ID, a Facility ID and a Facility Name. The Resort ID links a Facility to a resort, the Facility ID links the Facility to a Facility Record and the Name is the common name of the Facility. Example:

Resort ID: 000909190

Facility ID: 001000010

Facility Name: Ski Rental

When creating the Resort Facilities Screen, the number of facilities associated with the resort may be looked up in this table to determine the screen layout.

Facility Info Table

The Facility Info Table provides a Unique Facility ID and further descriptive and informational items. The Facility ID links this record to the Facilities Table. Example:

Facility ID: 001000010

Facility Name: Ski Rental

Costs:

Hours: 7:30–5:30 Daily

The Facility Info table is used to label the Button Objects, to determine the button image, and to associate data with a button so that when a user activates the button, the correct action will be initiated such as filling a text window or running an appropriate video.

Activities Table

The Activities Table provides a Unique Resort ID, a Facility ID and an Activity Name. The Resort ID links an Activity to a specific resort, and the Activity ID links an Activity to an Activity Record. Example:

Resort ID: 000909190
Activity ID: 002000001
Activity Name: Swimming

When laying out the Resort Activities Screen, the number of activities associated with the resort is looked up to determine the screen layout.

Activities Info Table

The Activities Info Table provides a Unique Activity ID and other information about the Activity. The Activity ID links an Activity to a record about that activity. Example:

Activity ID: 002000001
Activity Name: Swimming
Hours: 9-5 Daily
Cost: $10 per day The Activity Info table is used to label the Button Objects, determine the button image and associate data with a button so that when a user activates the button, the correct action will be initiated such as filling a text window or running an appropriate video.

Figure 5:
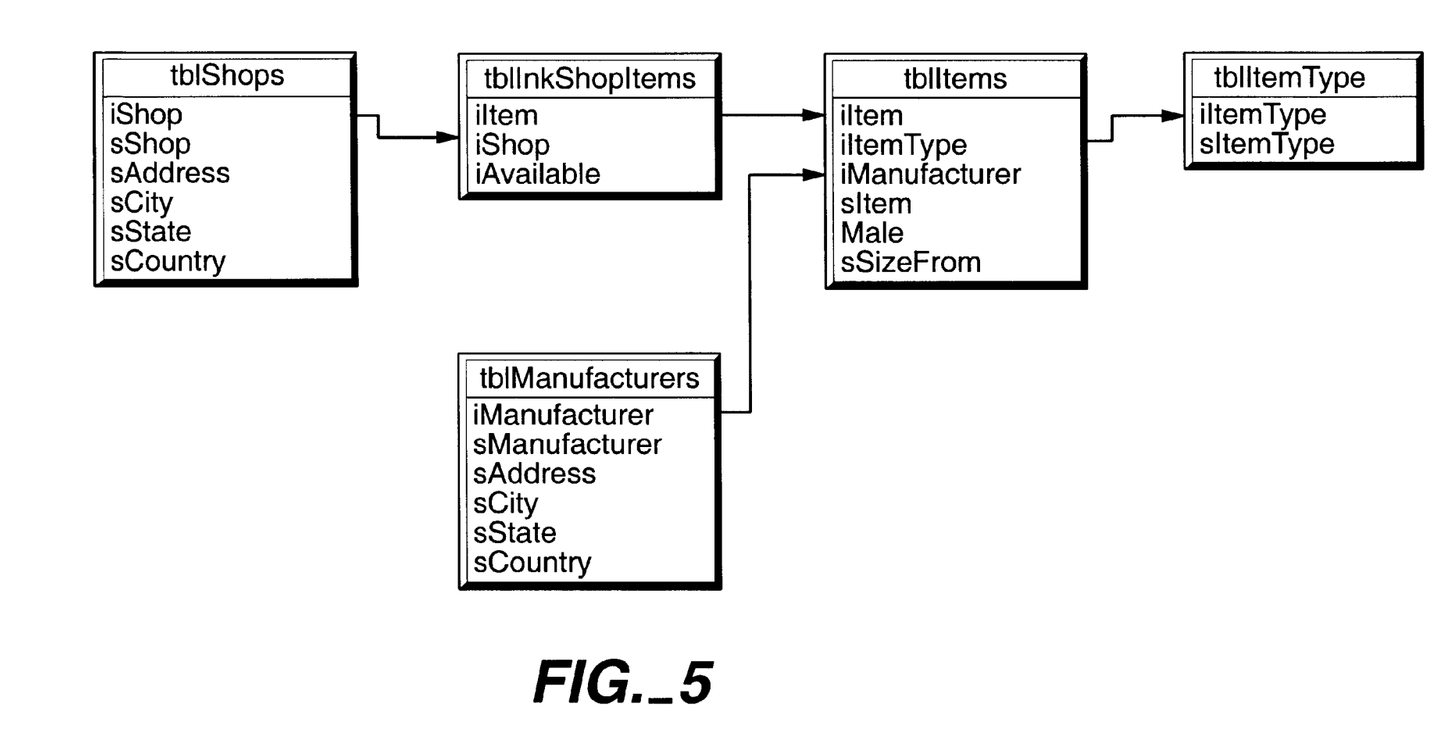
FIG. 5 is an example of a Shop/Manufacturer database joined table.

We turn now to a description of the individual tables making up the shops and manufacturers joined table of FIG. 5. This series of tables describes the equipment side of the kiosk system that links ski shops to ski equipment manufacturers and their products. The user interface for a kiosk in a ski shop may be created on the fly from the information in these tables. For example, for a kiosk in the ABC Ski Shop the Shops table will be linked to the manufacturer table and the manufacturer products table (referred to as Shop Items). The joined table provides the content for the Shop. The screen for the ABC Ski Shop will be populated based on the information in the joined table by performing a lookup of the Manufacturers and the type of associated information to create the interface. If the ABC Ski Shop carries skis from X Company, for example, then an X Company Ski Button will be placed on the screen. A significant point here is that the information about X Company skis is already in the database. It is only necessary that a table entry be included to indicate that the ABC Ski Shop carries X Company skis. As before, the appropriate number of button objects are placed according to a predefined screen type or by mathematical algorithm specifying screen coordinates.

The individual tables comprising FIG. 4 will now be described.

Shop Table

The Shop Table provides a Unique Shop ID, a shop name and address. The Shop ID provides a link to the Shop Items database. Example:

iShop: 0001
sShop: ABC Ski Shop

Based on the Shop ID a table lookup may be performed in the ShopsItem database. This will allow the system author to determine the items the shop carries. The Shop Table will generally also include address information and in particular may include a telephone or fax line, which can be used for downloading and uploading information with the kiosk.

Shop Items Table

The ShopItems table provides a Unique Item ID, a reference to the shop and a boolean value indicating whether the shop carries the item. If the shop carries the item, a table lookup can be performed in the Items table to obtain the attributes of the item or information about that item. Example:

iItem: 00001
iShop: 0001
fAvailable: True

Based on the iItem ID and the boolean value, information can be gathered about the shops inventory.

Items Table

The Items table contains all items from all manufacturers. The table includes an iItem ID, which specifies what the item is, an ItemType, which specifies what the type is, and a Manufacture ID, which specifies what Manufacture makes that Item. Example:

iItem: 00001
iItemType: 00100
    iManufacture: 10000
sItem: Skis
Male: Male or Female
sSizeForm: Sizes This table links all the items to the shop and manufacturers.

Item Type Table:

The table contains an Item Type ID and a description. The Item Type ID links an item type to an item. Example:

iItemType: 00100
sItemType: Alpine Skis

This table links an item to an item type.

Manufacturer Table

The Manufacturer table contains information on all manufacturers. It includes a unique Manufacturer ID, address information and any other relevant information. Example:

iManufacture: 10000
sManufacture: X Company
sAddress:
sCity:
sState:
sCounty:

The Manufacturer ID links an item to the Manufacturer of that item.

The authoring system is implemented in the embodiment illustrated here by means of a C++ interface to access the fields of the database as defined in the above sample tables. Standard Btrieve calls are used to access database. Software code generally referred to as a wrapper is written around the Btrieve API for linking the C++ interface to the Betrieve calls. The generation of such code is routine given the benefit of the disclosure herein and need not be described in detail here. Nevertheless here is a sample of such code.

---

The following are all member variables from the CMADbase Class.
Public data members:
```
BTIWORD     m_datalen;
BTI_BYTE    m_keyBuf[255];
BTI_SINT    m_status
```
Private data memebrs:
```
BTI_BYTE    posBlock[128];
BTI_BYTE    dataBuf[255];
```

-continued

```
BTI_WORD        dataLen;
BTI_WORD        keyNum = 0;
BRI_SINT        status
unsigned char m_fileOpen = FALSE;
These are structures defined for the Btrieve Records
struct
{
        FILE_SPECS      fileSpecs;
        KEY_SPECS       keySpecs[2];
} fileCreateBuf;
Member Functions
Functioin Name: Open
Description: Provide a wrapper for Btrieve Open File function
BOOL CMADBase::Open(CString sFileName)
{
    strcpy((BTI_CHAR*)m_keyBuf, sFileName);
    m_keyNum = 0;
    m_datalen = sizeof(fileCreateBuf);
    m_status = BTRV(B_OPEN, m_posBlock, m_dataBuf,
        &m_datalen,
        m_keyBuf, m)keyNum);
    if (m_status == B_NO_ERROR)
    {
        m_fileOpen = TRUE;
        return TRUE;
    }
    else
    {
        DisplayError(m_status);
        return FALSE;
    }
}
Functin Name: Close
Description: Provide a wapper for the Btrieve Close File function
BOOL CMADbase::Close( )
{
    if (m_fileOpen)
    {
        m_dataLen = 0;
        m_status = BTRV(B_CLOSE, m_posBlock, m_dataBuf,
            &m_dataLen, m_keyBuf, m_keyNum);
        if (m_status == B_NO_ERROR)
        {
            return TRUE;
        }
        else
        {
            DisplayError(m_status);
            return FALSE;
        }
    }
    return FALSE;
}
```

Providing wrapper functions around the Btrieve code gives the flexibility to switch to a differenct database in the future. When a new database is introduced, it is only necessary to change these wrapper functions. The code in the rest of program does not have to be altered.

The manner disclosed herein for defining a user interface for a specific kiosk has the advantage that to change the interface one need only perform a database lookup and fill out definition files for each kiosk. When the ABC Ski Shop first decides to place a kiosk in the shop, an ABC kiosk definition table is filled out for the ABC Ski Shop and entered into the database. The kiosk interface screens may then be quickly defined from database lookups. At a later time if the ABC Ski Shop should sell out of a model of X Company ski boots, that item can be removed from the definition table and the affected interface screen re-defined to remove any buttons or other objects that may have been associated with the sold-out item.

As mentioned above, when a central database server is not used, it is advantageous for each kiosk to contain the complete database, even including tables that will not be used at that kiosk. When the database tables are modified, for whatever reason, the modified database can be downloaded to each kiosk in the system. The advantages following from this are as follows. Version control: uncontrolled propagation of multiple version throughout the kiosks in the field is prevented. The need to keep track of which version each kiosk has is avoided. In this manner it is also easier to keep comply with contractual obligations to keep each subscriber updated with the latest version. Kiosk portability: A kiosk unit may be moved from one subscriber to another with no change of software or reconfiguration other than providing a definition file. Control over changing information providers: A ski shop may drop one line of product for a competitor's line. The ski shop's kiosk will already be configured for the full range of information providers. It is then only necessary to change a definition file. Loading and unloading of a multiplicity of information provider files is avoided. Broadcasting: It is easier to broadcast messages, for example, when X Company runs out of or discontinues a particular ski, this change can be made once and broadcast to all subscribers. Local and remoteconfiguration: The local layout for a particular kiosk subscriber can be configured either at the subscriber's location or remotely. This would not be feasible if the full database were not available at the subscriber's kiosk.

The above descriptions and drawings disclose illustrative embodiments of the invention. Given the benefit of this disclosure, those skilled in the art will appreciate that various modifications, alternate constructions, and equivalents may also be employed to achieve the advantages of the invention. For example, given the benefit of this disclosure, those skilled in the art will be able to implement kiosks in other subject areas than skiing and skiing-related subjects, which is only offered as an example. Therefore, the invention is not to be limited to the above description and illustrations, but is defined by the appended claims.

What is claimed is:

1. In an electronic kiosk system having a plurality of interactive electronic kiosks for displaying information provided by a plurality of information providers, a method for defining custom interface screens customized for individual kiosks of said plurality and operable to make different assortments of said information available for display at different kiosks of said plurality, said method comprising the steps of:

providing a master database of information from said plurality of information providers, said master database referencing substantially all information content from said providers to be displayed on any of said plurality of kiosks;

providing a plurality of pre-defined interface screen element types, each element type defining a form of element available for presentation on said custom interface screens, wherein each said element type permits limited variation in its on-screen characteristics in conformity with a desired uniform and aesthetically pleasing look and feel for said interface screens on all kiosks of said kiosk system, each element type having a plurality of attributes associated therewith, wherein each said element type and its associated attributes are subject to pre-defined constraints providing element characteristics in conformance with said uniform and aesthetically pleasing look and feel for said interface screens, and wherein said plurality of pre-defined element types includes at least one pre-defined window type, at least one pre-defined button type, and at least one pre-defined multimedia type;

selecting a plurality of elements to be included in a custom interface screen under construction, said plurality of elements being selected from said plurality of pre-defined elements types, said plurality of selected elements including at least one button type;

assigning values to the attributes associated with each of said selected elements consistent with said pre-defined constraints, whereby the aggregate layout of said plurality of selected elements on said interface screen under construction will be aesthetically pleasing and functionally operable for effective delivery of information to a kiosk user;

selecting from said master database an assortment of information content deriving from selected ones of said information providers to define kiosk information content for an individual kiosk of said kiosk system;

associating said kiosk information content with at least a portion of said selected elements for said interface screen under construction; and linking said at least one selected button type element to an action facilitating the viewing of at least portions of said kiosk information content by a kiosk user.

2. The method of claim 1 wherein the step of selecting an assortment of information content from said master database further comprises the substep of:

maintaining a kiosk definition table for each kiosk of said kiosk system identifying the information content of said master database to be associated with the respective kiosk.

3. The method of claim 2 further comprising the substep of populating an individual kiosk definition table with the respective kiosk information content by querying said master database.

4. The method of claim 2, further including the steps of:

selecting a plurality of buttons of a first button type; and placing said selected buttons on said interface screen according to a pre-configured pattern.

5. The method of claim 4 wherein said step of selecting a plurality of buttons further comprises the substeps of:

selecting a category of information from said kiosk information content, said category including subdivisions of information;

querying said kiosk definition table to determine the count of said subdivisions of said category; and selecting said buttons to correspond in number to said count of subdivisions, whereby said selected buttons are in one-to-one correspondence with said subdivisions.

6. The method of claim 5, wherein said step of placing said selected buttons on said interface screen further comprises the steps of:

providing a mathematical formula for a pre-configured pattern of button screen coordinates as a function of the number of buttons; and calculating the screen coordinates for said selected count of buttons according to said formula.

7. The method of claim 5, further comprising the steps of:

providing an interface screen lookup table specifying said pre-configured pattern of button placement for each of a number of counts of buttons; and placing said selected count of buttons on said interface screen in accordance with the pre-configured pattern specified in said interface screen lookup table for the count determined by querying said kiosk definition table.

8. The method of claim 1 wherein said pre-defined interface screen element types include at least two button types and at least two window types.

9. The method of claim 8 wherein selected items of information from said information providers are in formats selected from the group of information formats including text, an image, a sequence of images forming a slide presentation, a sequence of images forming an animated presentation, a video clip and a sound clip.

10. The method of claim 1 wherein said action is selected from the group of actions including updating the current screen, going to a new screen, playing a video file, playing an audio file, playing an animation file, playing a slide presentation file.

* * * * *